United States Patent
Cannan et al.

(10) Patent No.: US 9,670,401 B2
(45) Date of Patent: Jun. 6, 2017

(54) METHODS FOR PRODUCING SOLID CERAMIC PARTICLES USING A MICROWAVE FIRING PROCESS

(71) Applicant: CARBO CERAMICS INC., Houston, TX (US)

(72) Inventors: Chad Cannan, Houston, TX (US); Brett A. Wilson, Cypress, TX (US); Benjamin T. Eldred, Houston, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 14/831,249

(22) Filed: Aug. 20, 2015

(65) Prior Publication Data

US 2016/0068744 A1     Mar. 10, 2016

Related U.S. Application Data

(60) Provisional application No. 62/046,633, filed on Sep. 5, 2014.

(51) Int. Cl.
    *C09K 8/80*           (2006.01)
    *H05B 6/80*           (2006.01)
    *F26B 3/347*         (2006.01)

(52) U.S. Cl.
    CPC ............... *C09K 8/805* (2013.01); *C09K 8/80* (2013.01); *F26B 3/347* (2013.01); *H05B 6/80* (2013.01); *F26B 2210/02* (2013.01); *H05B 2206/046* (2013.01)

(58) Field of Classification Search
    CPC ............... C09K 8/80–8/805; C04B 2235/667
    See application file for complete search history.

(56) References Cited

U.S. PATENT DOCUMENTS

| | | | | |
|---|---|---|---|---|
| 3,533,829 A | * | 10/1970 | Quanquin | B01J 2/04 118/303 |
| 4,068,718 A | * | 1/1978 | Cooke, Jr. | E21B 43/267 166/280.2 |
| 4,427,068 A | * | 1/1984 | Fitzgibbon | E21B 43/267 166/280.2 |
| 4,440,866 A | * | 4/1984 | Lunghofer | B01J 2/16 264/117 |
| 5,188,175 A | * | 2/1993 | Sweet | C09K 8/62 166/280.2 |
| 7,036,591 B2 | * | 5/2006 | Cannan | C09K 8/80 166/280.2 |

(Continued)

FOREIGN PATENT DOCUMENTS

GB          1401303 A    *    7/1975   ............... B01J 2/02

*Primary Examiner* — Erin Snelting
(74) *Attorney, Agent, or Firm* — Patterson + Sheridan, LLP

(57) ABSTRACT

Methods for producing solid, substantially round, spherical and sintered particles from a slurry of a raw material having an alumina content of greater than about 40 weight percent. The slurry is processed to prepare green pellets which are sintered in a furnace with microwave energy at a temperature of 1480 to 1520° C. to produce solid, substantially round, spherical and sintered particles having an average particle size greater than about 200 microns, a bulk density of greater than about 1.35 g/cm$^3$, and an apparent specific gravity of greater than about 2.60.

11 Claims, 1 Drawing Sheet

(56) References Cited

U.S. PATENT DOCUMENTS

| | | | |
|---|---|---|---|
| 2003/0148893 A1* | 8/2003 | Lunghofer | C04B 33/04 507/200 |
| 2011/0160104 A1* | 6/2011 | Wu | C04B 35/195 507/269 |
| 2013/0206408 A1* | 8/2013 | Chatterjee | C04B 33/1352 166/280.1 |
| 2014/0038860 A1* | 2/2014 | Skala | C09K 8/80 507/269 |
| 2014/0110110 A1* | 4/2014 | Rohring | C09K 8/80 166/280.2 |

* cited by examiner

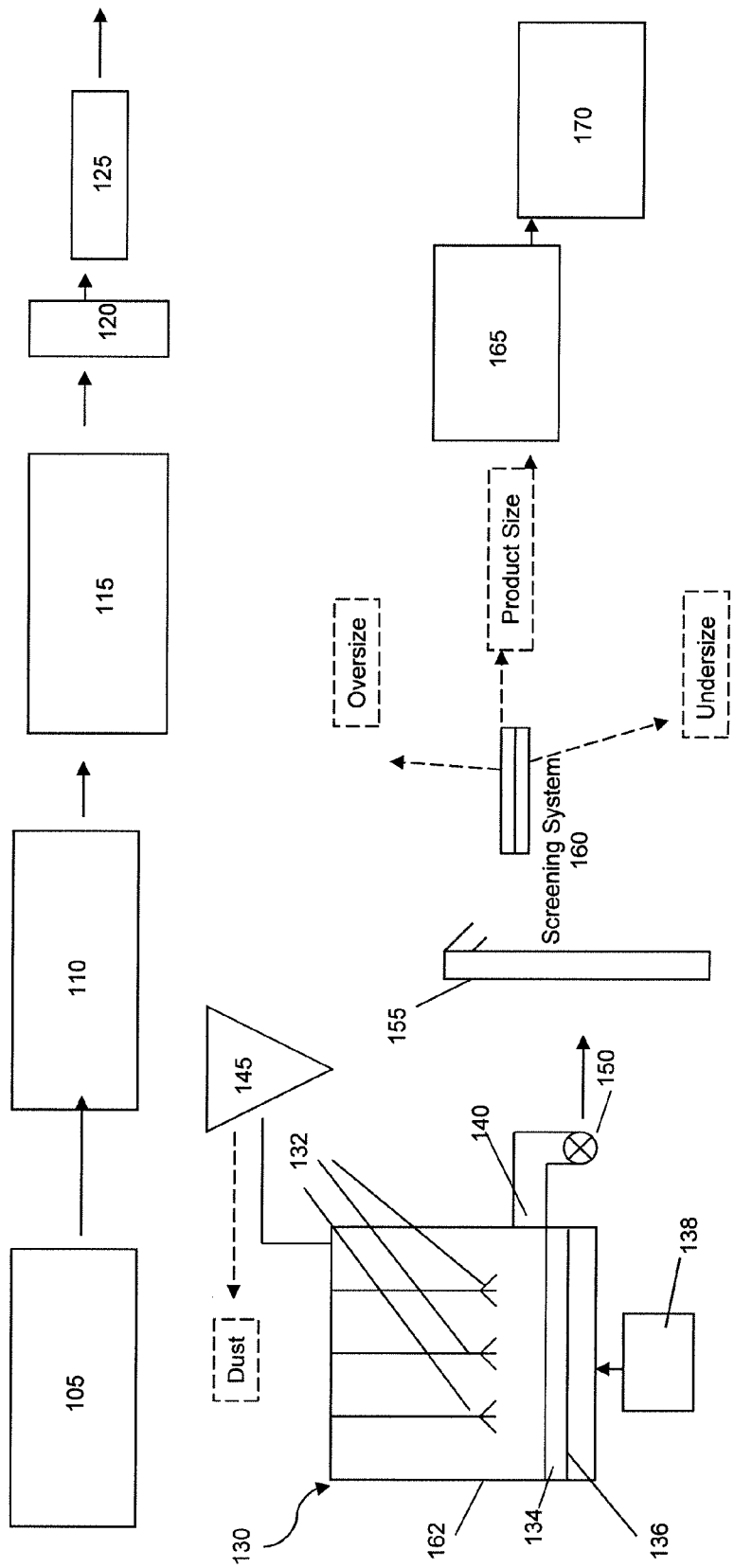

METHODS FOR PRODUCING SOLID CERAMIC PARTICLES USING A MICROWAVE FIRING PROCESS

CROSS-REFERENCE TO RELATED APPLICATION

The present application claims priority to, and the benefit of the filing date of, U.S. Patent Application No. 62/046,633, filed Sep. 5, 2014, the entire disclosure of which is hereby incorporated herein by reference.

FIELD OF THE INVENTION

The present invention relates to oil and gas well proppants and, more particularly, to proppants exhibiting excellent crush resistance in a broad range of applications.

BACKGROUND

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the oil or gas is held in a formation having insufficient permeability for economic recovery of the oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

Fracturing operations are more frequently being conducted at greater depths, which are under greater pressures. There is a need, therefore, for solid ceramic particles, and methods for making same, that have increased strength and crush resistance.

BRIEF DESCRIPTION OF THE DRAWINGS

The FIGURE is a schematic illustration of a system for preparing substantially round and spherical particles from a slurry, according to several exemplary embodiments of the present invention.

DETAILED DESCRIPTION

In the following description, numerous specific details are set forth. However, it is understood that embodiments of the invention may be practiced without these specific details. In other instances, well-known structures and techniques have not been shown in detail in order not to obscure the understanding of this description.

Described herein are methods for using microwave energy to fire and sinter proppants used in the hydraulic fracture stimulation of gas, oil, or geothermal reservoirs. Also described herein are the microwave-sintered, substantially round and spherical particles and methods for preparing such microwave-sintered, substantially round and spherical particles from a slurry of an alumina containing raw material for use as proppants. The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

According to several exemplary embodiments of the present invention, the microwave-sintered, substantially round and spherical particles, referred to hereinafter as "microwave-sintered proppant" can be made from conventional pre-sintered proppants such as ceramic proppant, sand, plastic beads and glass beads. Such conventional proppants can be manufactured up to the sintering step according to any suitable process including, but not limited to continuous spray atomization, spray fluidization, spray drying, or compression. Suitable conventional proppants and methods for their manufacture up to the sintering step are disclosed in U.S. Pat. Nos. 4,068,718, 4,427,068, 4,440,866, 5,188,175, and 7,036,591, the entire disclosures of which are incorporated herein by reference.

Ceramic proppants vary in properties such as apparent specific gravity by virtue of the starting raw material and the manufacturing process. The term "apparent specific gravity," (ASG) as used herein, refers to a number without units that is defined to be numerically equal to the weight in grams per cubic centimeter of volume, including void space, internal porosity or open porosity in determining the volume is the weight per unit volume (grams per cubic centimeter) of the particles. Low density proppants generally have an apparent specific gravity of less than 3.0 g/cm$^3$ and are typically made from kaolin clay and other alumina, oxide, or silicate ceramics. Intermediate density proppants generally have an apparent specific gravity of about 3.1 to 3.4 g/cm$^3$ and are typically made from bauxitic clay. High strength proppants are generally made from bauxitic clays with alumina and have an apparent specific gravity above 3.4 g/cm$^3$.

Ceramic proppant can also be manufactured in a manner that creates porosity in the proppant grain. A process to manufacture a suitable porous ceramic proppant is described in U.S. Pat. No. 7,036,591, the entire disclosure of which is incorporated herein by reference.

As described herein, the microwave sintered, substantially round and spherical particles are prepared from a slurry of an alumina-containing raw material. According to several exemplary embodiments, the substantially round and spherical particles can include alumina in any suitable amounts. According to several exemplary embodiments, the proppant particulates include at least about 20 wt %, at least about 30 wt %, at least about 35 wt %, or at least about 40 wt % alumina based on the total weight of the particles. According to several exemplary embodiments, the particulates include from about 20 wt % to about 99.9 wt % alumina, from about 25 wt % to about 65 wt % alumina, from about 30 wt % to about 55 wt % alumina, or from about 35 wt % to about 50 wt % alumina. In several exemplary embodiments, the particles include from about 10 wt % to about 90 wt % alumina, from about 25 wt % to about 75 wt % alumina, from about 35 wt % to about 65 wt % alumina, from about 40 wt % to about 55 wt % alumina, or from about 45 wt % to about 50 wt % alumina. In several exemplary embodiments, the sintered, substantially round and spherical particles include from about 41.5 wt % to about 49 wt % alumina.

In several exemplary embodiments, the microwave sintered, substantially round and spherical particles have a bulk density of from about 1.30 g/cm$^3$, about 1.35 g/cm$^3$, or about 1.42 g/cm³ to about 1.48 g/cm³, about 1.55 g/cm³, or about 1.60 g/cm³. The term "bulk density", (BD) as used herein, refers to the weight per unit volume, including in the volume considered, the void spaces between the particles. In several exemplary embodiments, the particles have a bulk density of from about 1.40 g/cm³ to about 1.50 g/cm³, from about 1.40 g/cm³ to about 1.45 g/cm³, or from about 1.45 g/cm³ to about 1.50 g/cm³.

In several exemplary embodiments, the microwave sintered, substantially round and spherical particles have a crush strength at 7,500 psi of from about 1%, about 1.5%, about 2.0%, or about 2.5% to about 3.0%, about 3.5%, about 4.0%, or about 4.5%, long term fluid conductivity at 7,500 psi of from about 1,475 millidarcy-feet (mD-ft), about 1,800 mD-ft, about 2,250 mD-ft, about 2,750 mD-ft, or about 3,500 mD-ft to about 4,500 mD-ft, about 5,500 mD-ft, about 6,500 mD-ft, about 7,500 mD-ft, or about 8,825 mD-ft and a long term permeability at 7,500 psi of from about 90 to about 480 darcies (D), about 150 D to about 475 D, about 250 D to about 450 D, or about 375 D to about 425 D. In several exemplary embodiments, the microwave sintered, substantially round and spherical particles have a crush strength at 7,500 psi of from about 1.5% to about 3.2%, about 1.8% to about 2.9%, or about 2.1% to about 2.6%.

In several exemplary embodiments, the microwave sintered, substantially round and spherical particles have a long term fluid conductivity at 10,000 psi of from about 2,000 mD-ft, about 2,250 mD-ft, or about 2,400 mD-ft to about 2,500 mD-ft, about 2,650 mD-ft, or about 2,750 mD-ft and a long term permeability at 10,000 psi of from about 130 D to about 165 D, about 140 D to about 160 D, or about 145 D to about 155 D. In several exemplary embodiments, the microwave sintered, substantially round and spherical particles have a long term fluid conductivity at 12,000 psi of from about 1,000 mD-ft, about 1,250 mD-ft, or about 1,400 mD-ft to about 1,500 mD-ft, about 1,650 mD-ft, or about 1,750 mD-ft and a long term permeability at 12,000 psi of from about 75 D to about 105 D, about 85 D to about 100 D, or about 95 D to about 100 D.

According to several exemplary embodiments, the microwave sintered, substantially round and spherical particles have an apparent specific gravity (ASG) of less than 3.1 g/cm³, less than 3.0 g/cm³, less than 2.9 g/cm³, less than 2.8 g/cm³, or less than 2.7 g/cm³. According to several exemplary embodiments, the microwave sintered, substantially round and spherical particles have an apparent specific gravity of greater than 2.0 g/cm³, greater than 2.4 g/cm³, greater than 2.6 g/cm³, or greater than 2.75 g/cm³. In several exemplary embodiments, the microwave sintered, substantially round and spherical particles have an apparent specific gravity of from about 2.60 g/cm³ to about 2.80 g/cm³, from about 2.70 g/cm³ to about 2.80 g/cm³, from about 2.60 g/cm³ to about 2.70 g/cm³, from about 2.75 g/cm³ to about 2.80 g/cm³, from about 2.70 g/cm³ to about 2.75 g/cm³, from about 2.60 g/cm³ to about 2.65 g/cm³, or from about 2.65 g/cm³ to about 2.70 g/cm³.

According to several exemplary embodiments, the microwave sintered, substantially round and spherical particles have a size of from about 16 to about 80 U.S. Mesh. According to several exemplary embodiments, the microwave sintered, substantially round and spherical particles are screened to provide product fractions designated as, for instance, 16/20 mesh, 20/40 mesh, 30/50 mesh and 40/80 mesh. In conventional manner, the 16/20 mesh sized product fraction passes through a 16 U.S. mesh (1190 microns) screen, but is caught on a 20 U.S. mesh (841 microns) screen. The other sized product fractions are sized according to this convention as well.

According to several exemplary embodiments, the microwave sintered, substantially round and spherical particles can have any suitable size. For example, the microwave sintered, substantially round and spherical particles can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the microwave sintered, substantially round and spherical particles have a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the microwave sintered, substantially round and spherical particles have a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments described herein, the microwave sintered, substantially round and spherical particles are made in a continuous process, while in several other exemplary embodiments, the particles are made in a batch process.

Referring now to the FIGURE, an exemplary system for implementing a continuous process for preparing microwave sintered, substantially round and spherical particles from a slurry is illustrated. Except for the microwave sintering furnace, the exemplary system illustrated in the FIGURE can have a similar configuration and operation to that described in U.S. Pat. No. 4,440,866, the entire disclosure of which is incorporated herein by reference. The operations performed by the exemplary system illustrated in the FIGURE can also be used to make the particles according to a batch process.

In the system illustrated in the FIGURE, an alumina-containing raw material having an alumina content of from about 10 wt % to about 90 wt %, from about 25 wt % to about 75 wt %, from about 35 wt % to about 65 wt %, from about 40 wt % to about 55 wt %, or from about 45 wt % to about 50 wt % (on a calcined basis) is passed through a shredder 105 which slices and breaks apart the raw material into small chunks. In some embodiments, when the raw material as mined, or as received, (referred to herein as "untreated" raw material) is of such consistency that it can be processed as described herein without shredding, the shredder can be bypassed. Raw material fed through a shredder such as is illustrated in the FIGURE, is referred to as "treated" raw material.

In several exemplary embodiments, the shredder breaks apart and slices the alumina-containing raw material so as to yield pieces having a diameter of less than about 10 inches, less than about 7 inches, less than about 5 inches, less than about 3 inches, or less than about 1 inch, although pieces having smaller and larger diameters can be further processed into a slurry as described herein. Shredders and numerous other devices for slicing, chopping or comminuting the alumina-containing raw material, as well as commercial sources for same, such as the Gleason Foundry Company, are well known to those of ordinary skill in the art.

The treated or untreated alumina-containing raw material and water can be fed to a blunger 110, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well known to those of ordinary skill in the art.

A sufficient amount of water can be added to the blunger 110 to result in a slurry having a solids content in the range of from about 10%, about 20%, about 40%, or about 50% to about 55%, about 60%, about 70%, or about 85% by weight. According to several exemplary embodiments, a sufficient amount of water is added to the slurry such that the solids content of the slurry is from about 45% to about 55%, about 45% to about 50%, or about 50% to about 65% by weight. According to several exemplary embodiments, a sufficient amount of water is added to the slurry such that the solids content of the slurry is about 50% by weight. The water added to the blunger 110 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well known and understood by those of ordinary skill in the art.

According to several exemplary embodiments, a dispersant is added to the slurry in the blunger 110 to adjust the viscosity of the slurry to a target range as discussed further below. In several exemplary embodiments, the viscosity of the slurry in the blunger 110 is adjusted to the target range by the addition of a dispersant and a pH-adjusting reagent.

A dispersant can be added to the slurry prior to the addition of other additives. According to several exemplary embodiments, the composition includes a dispersant in an amount of from about 0.05%, about 0.10%, about 0.15%, or about 0.20% to about 0.25%, about 0.30%, about 0.35%, or about 0.45% by weight based on the dry weight of the alumina-containing raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In several exemplary embodiments, the target viscosity is less than 150 centipoises (cps) (as determined on a Brookfield Viscometer with a #61 spindle). According to several exemplary embodiments, the target viscosity is less than 125 cps, less than 100 cps, less than 80 cps, less than 70 cps, less than 60 cps, less than 50 cps, less than 40 cps, less than 30 cps, or less than 20 cps.

According to several exemplary embodiments in which a pH-adjusting reagent is used, a sufficient amount of a pH-adjusting reagent is added to the slurry to adjust the pH of the slurry to a range of from about 8 to about 11. In several exemplary embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 110 mixes the alumina-containing raw material, water, dispersant and pH-adjusting reagent until a slurry is formed. The length of time required to form a slurry is dependent on factors such as the size of the blunger, the speed at which the blunger is operating, and the amount of material in the blunger.

From the blunger 110, the slurry is fed to a tank 115, where the slurry is continuously stirred, and a binder is added in an amount of from about 0.01%, about 0.05%, about 0.1%, about 0.2%, about 0.5%, about 1.0%, or about 2.0% to about 3.0%, about 5.0%, about 7.0%, about 10.0%, about 12.0%, about 15.0%, or about 20.0% by weight, based on the total dry weight of the alumina-containing raw material. In several exemplary embodiments, the binder is added in an amount of from about 0.2% to about 3.0%, about 0.7% to about 2.5%, or about 1.5% to about 2.0% by weight based on the total dry weight of the alumina-containing raw material. Suitable binders include but are not limited to polyvinyl acetate, polyvinyl alcohol (PVA), methylcellulose, dextrin and molasses. In several exemplary embodiments, the binder is PVA having a molecular weight of from about 1,000 Mn, about 5,000 Mn, about 10,000 Mn, about 20,000 Mn, or about 40,000 Mn to about 60,000 Mn, about 80,000 Mn, about 100,000 Mn, about 120,000 Mn, or about 200,000 Mn. "Mn" represents the number average molecular weight which is the total weight of the polymeric molecules in a sample, divided by the total number of polymeric molecules in that sample.

The tank 115 maintains the slurry created by the blunger 110. However, the tank 115 can stir the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

According to several exemplary embodiments, the binder can be added to the slurry while in the blunger 110. According to such embodiments, the blunger 110 optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 115 illustrated in the FIGURE, the slurry is stirred in the tank, after addition of the binder, for a time sufficient to thoroughly mix the binder with the slurry. In several exemplary embodiments, the slurry is stirred in the tank 115 for up to about 30 minutes following the addition of binder. In several exemplary embodiments, the slurry is stirred in the tank 115 for at least about 30 minutes. In several exemplary embodiments, the slurry is stirred in the tank for more than about 30 minutes after addition of the binder.

Tank 115 can also be a tank system comprised of one, two, three or more tanks. Any configuration or number of tanks that enables the thorough mixing of the binder with the slurry is sufficient. In a continuous process, water, and one or more of dust, oversize particles, or undersize particles from a subsequent fluidizer or other apparatus can be added to the slurry in the tank 115.

From the tank 115, the slurry is fed to a heat exchanger 120, which heats the slurry to a temperature of from about 5° C., about 10° C., about 15° C., about 25° C., about 35° C., or about 50° C. to about 65° C., about 75° C., about 90° C., about 95° C., about 99° C., or about 105° C. From the heat exchanger 120, the slurry is fed to a pump system 125, which feeds the slurry, under pressure, to a fluidizer 130.

A grinding mill(s) and/or a screening system(s) (not illustrated) can be inserted at one or more places in the system illustrated in the FIGURE prior to feeding the slurry to the fluidizer to assist in breaking any larger-sized alumina-containing raw material down to a target size suitable for feeding to the fluidizer. In several exemplary embodiments, the target size is less than 230 mesh. In several exemplary embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

Referring again to the FIGURE, fluidizer 130 is of conventional design, such as described in, for example, U.S. Pat. No. 3,533,829 and U.K. Patent No. 1,401,303. Fluidizer 130 includes at least one atomizing nozzle 132 (three atomizing nozzles 132 being shown in the FIGURE), which is a pressure nozzle of conventional design. In other embodiments, one or more two-fluid nozzles are suitable. The design of such nozzles is well known, for example from K. Masters: "Spray Drying Handbook", John Wiley and Sons, New York (1979).

Fluidizer 130 further includes a particle bed 134, which is supported by a plate 136, such as a perforated, straight or directional plate. Hot air flows through the plate 136. The particle bed 134 comprises seeds from which green pellets of a target size can be grown. The term "green pellets" and related forms, as used herein, refers to substantially round and spherical particles which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In several exemplary embodiments, the seed comprises from about 5% to about 20% of the total volume of a green pellet formed therefrom. The slurry is sprayed, under pressure, through the atomizing nozzles 132, and the slurry spray coats the seeds to form green pellets that are substantially round and spherical.

External seeds can be placed on the perforated plate 136 before atomization of the slurry by the fluidizer begins. If external seeds are used, the seeds can be prepared in a slurry process similar to that illustrated in the FIGURE, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to several exemplary embodiments, external seeds are made from either a raw material having at least the same alumina content as the raw material used to make the slurry, or from a raw material having more or less alumina than the raw material used to make the slurry. In several exemplary embodiments, the slurry has an alumina content that is at least 10%, at least 20%, or at least 30% less than that of the seeds. In several exemplary embodiments, the external seeds have an alumina content less than that of the slurry, such as at least 10%, at least 20%, or at least 30% less than that of the slurry.

Alternatively, seeds for the particle bed are formed by the atomization of the slurry, thereby providing a method by which the slurry "self-germinates" with its own seed. According to several exemplary embodiments, the slurry is fed through the fluidizer 130 in the absence of a seeded particle bed 134. The slurry droplets exiting the nozzles 132 solidify, but are small enough initially that they get carried out of the fluidizer 130 by air flow and caught as "dust" (fine particles) by a dust collector 145, which can, for instance, be an electrostatic precipitator, a cyclone, a bag filter, a wet scrubber or a combination thereof. The dust from the dust collector is then fed to the particle bed 134 through dust inlet 162, where it is sprayed with slurry exiting the nozzles 132. The dust particles can be recycled a sufficient number of times, until they have grown to a point where they are too large to be carried out by the air flow and can serve as seeds. The dust particles can also be recycled to another operation in the process, for example, the tank 115.

Referring again to the FIGURE, hot air is introduced to the fluidizer 130 by means of a fan and an air heater, which are schematically represented at 138. The velocity of the hot air passing through the particle bed 134 can be from about 0.1 meters/second, about 0.5 meters/second, or about 0.9 meters/second to about 1.2 meters/second, about 1.5 meters/second, or about 2.0 meters/second, and the depth of the particle bed 134 can be from about 1 centimeter, about 2 centimeters, about 5 centimeters, about 10 centimeters, or about 20 centimeters to about 30 centimeters, about 40 centimeters, about 60 centimeters, about 80 centimeters, or about 100 centimeters. The temperature of the hot air when introduced to the fluidizer 130 can be from about 100° C., about 150° C., about 200° C., or about 250° C. to about 300° C., about 400° C., about 500° C., about 600° C., about 650° C., or about 1,000° C. The temperature of the hot air as it exits from the fluidizer 130 can be less than about 250° C., less than about 200° C., or less than about 150° C., and in several exemplary embodiments is less than about 100° C.

The distance between the atomizing nozzles 132 and the plate 136 is optimized to avoid the formation of dust which occurs when the nozzles 132 are too far away from the plate 126 and the formation of irregular, coarse particles which occurs when the nozzles 132 are too close to the plate 136. The position of the nozzles 132 with respect to the plate 136 is adjusted on the basis of an analysis of powder sampled from the fluidizer 130.

The green pellets formed by the fluidizer accumulate in the particle bed 134. In a continuous process, the green pellets formed by the fluidizer 130 are withdrawn through an outlet 140 in response to the level of product in the particle bed 134 in the fluidizer 130, so as to maintain a given depth in the particle bed. A rotary valve 150 conducts green pellets withdrawn from the fluidizer 130 to an elevator 155, which feeds the green pellets to a screening system 160, where the green pellets are separated into one or more fractions, for example, an oversize fraction, a product fraction, and an undersize fraction.

The oversize fraction exiting the screening unit 160 includes those green pellets that are larger than the desired product size. In a continuous process, the oversize green pellets can be recycled to tank 115, where at least some of the oversize green pellets can be broken down and blended with slurry in the tank. Alternatively, oversize green pellets can be broken down and recycled to the particle bed 134 in the fluidizer 130. The undersize fraction exiting the screening system 160 includes those green pellets that are smaller than the desired product size. In a continuous process, these green pellets can be recycled to the fluidizer 130, where they can be fed through an inlet 162 as seeds or as a secondary feed to the fluidizer 130.

The product fraction exiting the screening system 160 includes those green pellets having the desired product size. The size limits for the product fractions exiting the screening system 160 are fixed with due regard to the fact that in the subsequent sintering process, substantial shrinkage of the green pellets can occur depending upon the starting materials from which the green pellets are made. The green pellets exiting the screening system 160 can be sent to a pre-sintering device 165, for example, a calciner, where the green pellets are dried or calcined prior to sintering. In several exemplary embodiments, the green pellets are dried in the pre-sintering device 165 to a moisture content of less than about 25% by weight, less than about 18% by weight, less than about 15% by weight, less than about 12% by weight, less than about 10% by weight, less than about 5% by weight, or less than about 1% by weight. The pre-sintering device 165 can be or include any suitable device for removing moisture from the green pellets. In an exemplary embodiment, the pre-sintering device 165 can include a calciner. The calciner can be or include one or more direct and/or indirect fired rotary kilns.

In several exemplary embodiments, after drying and/or calcining, the green pellets are fed to a microwave furnace 170, in which the green pellets are sintered for a period of time and at a temperature sufficient to enable recovery of microwave sintered, substantially round and spherical particles having one or more of a desired apparent specific gravity, bulk density, and crush strength. According to several exemplary embodiments, the microwave furnace 170 is a rotary furnace having a rotating section (not shown) and non-rotating sections (not shown) disposed at either end of the rotating section. In an exemplary embodiment, the microwave furnace 170 can include a rotating section having a first end and a second end. A first non-rotating section can be coupled to or in fluid communication with the first end of the rotating section and a second non-rotating section can be coupled to or in fluid communication with the second end of the rotating section. In an exemplary embodiment, the rotating section can include an interior or cavity. At least a portion of the cavity of the rotating section can be lined with a refractory lining. The refractory lining can include alumina oxide, silica oxide, magnesia oxide, or any suitable combination or mixture thereof.

The microwave furnace 170 can include any suitable number and arrangement of microwave generators. The microwave furnace can include from 1, 2, 3, or 4 to 6, 8, 10, or 20 microwave generators. The microwave generators can be coupled to the non-rotating sections of the microwave furnace 170 at any suitable location. For example, 1, 2, 3, 4, 5, or 6 or more microwave generators can be disposed about the circumference of the first and/or second non-rotating sections to direct microwave energy into the cavity of the rotating section. The microwave generators disposed about the circumference of the non-rotating section(s) can be axially aligned or axially offset with respect to one another. The 1, 2, 3, 4, 5, or 6 or more microwave generators can also be spaced apart and disposed along the length of the non-rotating section(s) to direct microwave energy into the cavity of the rotating section. One or more of the microwave generators can generate a temperature of about 200° C., about 350° C., about 500° C., about 650° C., or about 800° C. to about 1,000° C., about 1,200° C., about 1,350° C., about 1,400° C., or about 1,550° C. or more in the cavity of the rotating section. In an exemplary embodiment, the maximum temperature that can be generated in the cavity by the microwave generators is about 1,600° C., about 1,620° C., about 1,650° C., or about 1,700° C. The one or more microwave generators can achieve a heating rate of from about 1° C./min, about 2° C./min, about 5° C./min, about 7° C./min, or about 9° C./min to about 11° C./min, about 13° C./min, about 15° C./min, about 20° C./min, or about 25° C./min in the cavity of the rotating section.

Alternatively, the pre-sintering device 165 can be eliminated if the microwave furnace 170 can provide sufficient calcining and/or drying conditions (i.e., drying times and temperatures that dry the green pellets to a target moisture content prior to sintering), followed by sufficient sintering conditions. The green pellets exiting the screening system 160 can be sent, either directly or indirectly, to the microwave furnace 170, where the green pellets are dried, calcined, and/or sintered. In several exemplary embodiments, the green pellets introduced to the microwave furnace have a moisture content of at least about 25% by weight, at least about 18% by weight, at least about 15% by weight, at least about 12% by weight, at least about 10% by weight, at least about 5% by weight, or at least about 1% by weight.

The specific time and temperature to be employed for sintering is dependent on the starting ingredients and the desired density for the sintered particles. In several exemplary embodiments, the microwave furnace 170 is a continuous microwave furnace, operating at a peak temperature of from about 1,350° C., about 1,420° C., or about 1,480° C. to about 1,520° C., about 1,580° C., or about 1,620° C. and the green pellets are sintered at the peak temperature of the continuous microwave furnace for a cycle time of from about 5, about 10, about 15 to about 20, about 30, about 40, about 45, or about 60 minutes or more. In several exemplary embodiments, the continuous microwave furnace has a pre-heat zone, a sintering zone and a cooling zone. According to such several exemplary embodiments, the pellets have a residence time in the pre-heat, sintering and cooling zones of the microwave furnace of about 30 minutes to about 120 minutes, about 50 minutes to about 200 minutes, and about 60 minutes to about 240 minutes, respectively.

According to several exemplary embodiments, the microwave-sintered, substantially round and spherical particles, or microwave-sintered proppant described above, is withdrawn from the microwave furnace 170. After the particles exit the microwave furnace 170, they can be further screened for size, and tested for quality control purposes.

The following examples are illustrative of the methods and particles discussed above.

EXAMPLES

In the following examples, green pellets for forming various sizes of conventional low density and medium density ceramic proppants were prepared for sintering in a continuous microwave furnace. The green pellets were sized with shrinkage in mind for ultimate production of 16/20 mesh, 20/40 mesh, 30/50 mesh and 40/80 mesh-sized proppant samples. The green pellets were those that are used to make products marketed under the trade names CARBOLite (CL) 16/20, CARBOLite (CL) 20/40, CARBOLite (CL) 30/50 and HydroProp 40/80 which are commercially available from CARBO Ceramics, Inc. of Houston, Tex.

The green pellets of various sizes were processed in a continuous microwave processing system having a pusher-type furnace using rectangular crucibles/boat having an approximate capacity of about 400 grams of proppant material. A total of 28 such boats were in the tunnel of the continuous microwave processing system at any given time during continuous pusher operation. The pusher system had a lateral speed of 15 mm to 600 mm per hour, a microwave power output of 0.9 to 12 KW and a temperature range of 450° C. to 1,500° C.

The green particles were sintered in the tunnel of the continuous microwave processing system to produce substantially round and spherical solid ceramic particles. Sintering was achieved using a heating rate of 10° C./min to a peak temperature of about 1,520° C. with various times at peak temperature. In the results discussed below, the bulk density, apparent specific gravity and crush strength of the sintered solid ceramic particles were determined using API Recommended Practices RP60 for testing proppants.

In the continuous microwave processing system, the temperature was monitored with thermocouples at 4 points in the system as follows: T1 in the pre-heat zone, T2 and T3 in the sinter-heat zone and T4 in the cooling zone. T1, T2 and T3 provide feedback for microwave power regulation and temperature control in the pre-heat and sinter-heat zones, while T4 monitors the temperature in the cooling zone.

The sample boats in the continuous microwave furnace had lids on them to facilitate uniform heating of their contents. The lids did not have holes, and the temperature within a closed lid sample boat was measured to be approximately 100° C. higher in the closed boat with a lid surface temperature around 1,400° C. The increase in temperature caused by the lids enabled the green pellet samples to be sintered at a peak temperature of 1,520° C. even though the maximum output temperature of the microwave furnace was 1,500° C.

Based on the design and microwave power input to the different regions of the microwave furnace, the maximum temperature possible at T1 in the preheat zone was up to about 700° C. and the maximum temperature for T2 and T3 in the sinter-heat zone was up to about 1,500° C. The fastest cycle time (frequency of boat input) possible was 5 min.

Five different sets of trials were carried out as set forth below in Examples 1-5.

Example 1

5 Sample Boats of CL16/20, Cycle Times 10 Min. & 5 Min.

According to Example 1, 5 boats with proppant samples were processed in the continuous microwave processing system. The sample boats were fed into the continuous microwave processing system with a cycle time of 10 minutes except for the fifth sample boat for which the cycle time was 5 minutes.

The 5 samples were assigned ref. nos. 1A-1E and the results are shown below in Table 1.

TABLE 1

| Sample ID | Material | Approx. Kiln Peak Temp (° C.) | Cycle Time (min) | Meas. BD (g/cm$^3$) | Target BD (g/cm$^3$) | Crush (%) at 7500 psi | Target Crush(%) at 7500 psi |
|---|---|---|---|---|---|---|---|
| 1A | CL16/20 | 1446 | 10 | 1.582 | 1.57 | 12.5 | 14 |
| 1B | CL16/20 | 1443 | 10 | 1.564 | 1.57 | 12.7 | 14 |
| 1C | CL16/20 | 1440 | 10 | 1.555 | 1.57 | 12.5 | 14 |
| 1D | CL16/20 | 1437 | 10 | 1.538 | 1.57 | 13.3 | 14 |
| 1E | CL16/20 | 1430 | 5 | 1.527 | 1.57 | 13.4 | 14 |

As shown in TABLE 1, the measured bulk density (BD) of the microwave sintered samples dropped as the peak temperature of the microwave furnace dropped.

Also as shown in TABLE 1, the crush percentage of the microwave sintered samples increased as the peak temperature of the microwave furnace dropped. Nevertheless, the crush percentage of the microwave sintered samples was lower in each instance than the target crush percentage of comparable conventional rotary kiln sintered proppant even when the measured bulk density of the microwave sintered samples dropped below the target bulk density values.

Example 2

3 Sample Boats, 1 Each of CL20/40, CL30/50 & HP40/80, Cycle Time 15 Minutes According to Example 2, 3 sample boats—one each of CL20/40, CL30/50 & HP40/80—were processed in the continuous microwave processing system. The sample boats were fed into the continuous microwave processing system with a cycle time of 15 minutes.

The samples were assigned ref. nos. 2A, 2B & 2C, respectively, and the results are shown below in Table 2.

TABLE 2

| Sample ID | Material | Peak Temp (° C.) | Cycle Time (min) | Meas BD (g/cm³) | Target BD (g/cm³) | Meas. ASG | Target ASG | API Crush at 7500 psi | Target Crush at 7500 psi |
|---|---|---|---|---|---|---|---|---|---|
| 2A | CL20/40 | 1414 | 15 | 1.56 | 1.56 | 2.77 | 2.72 | 3.1 | 4.1 |
| 2B | CL30/50 | 1414 | 15 | 1.54 | 1.54 | 2.78 | 2.72 | 1.5 | 1.9 |
| 2C | HP40/80 | 1419 | 15 | 1.38 | 1.43 | 2.68 | 2.55 | 2.5 | 2.8 |

In each instance, the measured bulk density of the microwave processed samples was comparable or slightly below the target values. The ASG and crush percentage values, however, for the samples prepared according to Example 2, were better in each instance in comparison to the target values from conventional processing.

Example 3

10 Sample Boats, 5 Boats Each of CL20/40 & CL30/50, Cycle Time 15 Min.

According to Example 3, 10 sample boats, five each of CL20/40 & CL30/50 were processed in the continuous microwave processing system. The sample boats were fed into the continuous microwave processing system with a cycle time of 15 minutes.

The different sample groups were assigned ref. nos. 3(A-E) & 3(F-J) and the results are shown below in Table 3.

TABLE 3

| Sample ID | Material | Peak Temp (° C.) | Cycle Time (min) | Meas BD (g/cm³) | Target BD (g/cm³) | Meas. ASG | Target ASG | API Crush at 7500 psi | Target Crush value |
|---|---|---|---|---|---|---|---|---|---|
| 3A | CL20/40 | 1426 | 15 | 1.57 | 1.56 | 2.78 | 2.72 | 2.8 | 4.1 |
| 3B | CL20/40 | 1426 | 15 | 1.57 | 1.56 | 2.78 | 2.72 |  | 4.1 |
| 3C | CL20/40 | 1429 | 15 | 1.57 | 1.56 | 2.78 | 2.72 |  | 4.1 |
| 3D | CL20/40 | 1429 | 15 | 1.57 | 1.56 | 2.77 | 2.72 |  | 4.1 |
| 3E | CL20/40 | 1421 | 15 | 1.58 | 1.56 | 2.78 | 2.72 | 2.0 | 4.1 |
| 3F | CL30/50 | 1406 | 15 | 1.54 | 1.54 | 2.77 | 2.72 | 1.3 | 1.9 |
| 3G | CL30/50 | 1412 | 15 | 1.54 | 1.54 | 2.77 | 2.72 |  | 1.9 |
| 3H | CL30/50 | 1412 | 15 | 1.54 | 1.54 | 2.78 | 2.72 |  | 1.9 |
| 3I | CL30/50 | 1407 | 15 | 1.54 | 1.54 | 2.77 | 2.72 |  | 1.9 |
| 3J | CL30/50 | 1406 | 15 | 1.54 | 1.54 | 2.77 | 2.72 | 1.5 | 1.9 |

As shown in Table 3, the measured bulk densities of the CL20/40 and CL30/50 microwave processed samples were comparable to or better than the target values from conventional processing.

The ASG and crush values of the CL20/40 and CL30/50 microwave processed samples with a cycle time of 15 minutes were significantly better in comparison to the target values from conventional processing.

Example 4

5 Sample Boats of HP40/80, Cycle Time 15 Minutes

According to Example 4, 5 sample boats of HP40/80 were processed in the continuous microwave processing system. The sample boats were fed into the continuous microwave processing system with a cycle time of 15 minutes.

The five samples were assigned ref. nos. 4(A-E) and the results are shown below in Table 4.

TABLE 4

| Sample ID | Material | Peak Temp (° C.) | Cycle Time (min) | Meas BD (g/cm³) | Target BD (g/cm³) | Meas. ASG | Target ASG | API Crush at 7500 psi | Target Crush value |
|---|---|---|---|---|---|---|---|---|---|
| 4A | HP40/80 | ~1440 | 15 | 1.39 | 1.43 | 2.71 | 2.55 | 2.4 | 2.8 |
| 4B | HP40/80 | ~1440 | 15 | 1.39 | 1.43 | 2.68 | 2.55 |  | 2.8 |
| 4C | HP40/80 | ~1440 | 15 | 1.40 | 1.43 | 2.71 | 2.55 |  | 2.8 |
| 4D | HP40/80 | ~1440 | 15 | 1.39 | 1.43 | 2.71 | 2.55 |  | 2.8 |
| 4E | HP40/80 | ~1440 | 15 | 1.39 | 1.43 | 2.70 | 2.55 | 2.1 | 2.8 |

The measured bulk density of the HP40/80 microwave processed samples was below target values from conventional processing.

The ASG values of the HP40/80 microwave processed samples with a cycle time of 15 minutes were slightly higher compared to the target values from conventional processing. The crush values of the HP40/80 microwave processed samples with a cycle time of 15 minutes were lower compared to the target values from conventional processing.

Example 5

5 Sample Boats of CL20/40, Cycle Time 20 Minutes

According to Example 5, a set of 5 sample boats of CL20/40 were processed in the continuous microwave processing system. The sample boats were fed into the continuous microwave processing system with a cycle time of 20 minutes.

The five samples were assigned ref. nos. 5(A-E) and the results are shown below in Table 5.

TABLE 5

| Sample ID | Material | Peak Temp (° C.) | Cycle Time (min) | Meas BD (g/cm$^3$) | Target BD (g/cm$^3$) | Meas. ASG | Target ASG | API Crush at 7500 psi | Target Crush value |
|---|---|---|---|---|---|---|---|---|---|
| 5A | CL20/40 | 1418 | 20 | 1.57 | 1.56 | 2.78 | 2.72 | 3.0 | 4.1 |
| 5B | CL20/40 | 1423 | 20 | 1.57 | 1.56 | 2.78 | 2.72 |  | 4.1 |
| 5C | CL20/40 | 1429 | 20 | 1.57 | 1.56 | 2.78 | 2.72 |  | 4.1 |
| 5D | CL20/40 | 1429 | 20 | 1.27 | 1.56 | 2.77 | 2.72 |  | 4.1 |
| 5E | CL20/40 | 1426 | 20 | 1.57 | 1.56 | 2.78 | 2.72 | 4.4 | 4.1 |

The measured bulk density of the CL20/40 microwave processed samples with a cycle time of 20 minutes was comparable to target values from conventional processing.

The ASG of the CL20/40 microwave processed samples with a cycle time of 20 minutes was comparable to similar samples from Example 3.

The crush value of the CL20/40 microwave processed samples with a cycle time of 20 minutes was not as good as that obtained for similar samples from Example 3, which samples were microwave processed with a cycle time of 15 minutes.

It was observed from the results of Examples 1-5, that the measured BD (bulk density) and crush percent values tended to deteriorate with a drop of microwave furnace/kiln peak temperature. However, the measured crush percent values of microwave processed samples were better than the target values from conventional processing even when the measured bulk density values of microwave processed samples dropped below the target bulk density values from conventional processing.

The effect of increased cycle time on microwave processed sample properties was investigated. The crush value of the CL20/40 microwave processed samples with a cycle time of 20 minutes were higher than the crush values obtained for similar samples that were microwave processed with a cycle time of 15 minutes.

Example 6

According to Example 6, two samples of proppant sample 3D from Example 3 above, which were CL20/40 samples that were processed with a cycle time of 15 minutes and two samples of a conventional CL20/40 proppant that were sintered in a gas-fired rotary furnace, were tested in terms of long term conductivity and long term permeability.

The 4 samples were assigned ref. nos. 6A-6D and the results are shown below in Table 6.

TABLE 6

| Sample ID | Description | Sample mass (g) | Long Term Conductivity (mD-ft) | | | | | | Long Term Permeability (D) | | | | | |
|---|---|---|---|---|---|---|---|---|---|---|---|---|---|---|
| | | | 2k psi | 4k psi | 6k psi | 8k psi | 10k psi | 12k psi | 2k psi | 4k psi | 6k psi | 8k psi | 10k psi | 12k psi |
| 6A | Conventional 20/40 CL | 63.0 g | 8615 | 7920 | 6052 | 4026 | 2706 | 1683 | 481 | 439 | 339 | 233 | 161 | 104 |
| 6B | Sample 3D from Example 3 | 63.0 g | 8659 | 7696 | 5824 | 3847 | 2584 | 1575 | 470 | 424 | 326 | 222 | 154 | 98 |
| 6C | Conventional 20/40 CL | 63.0 g | 8680 | 8066 | 6193 | 3941 | 2591 | 1570 | 482 | 446 | 348 | 230 | 155 | 98 |
| 6D | Sample 3D from Example 3 | 63.0 g | 8822 | 7601 | 5760 | 3892 | 2498 | 1479 | 480 | 414 | 321 | 223 | 148 | 91 |

The long term conductivity for samples 3D from Example 3 ranged from 1,479 to 8,822 millidarcy-feet (mD-ft) compared to 1,570 to 8,680 mD-ft for the conventional CL20/40 samples. Also, the long term permeability for samples 3D from Example 3 ranged from 91 to 480 darcies (D) compared to 98 to 482 D for the conventional CL20/40 samples. The long term conductivity and the long term permeability were each measured under closure stresses of 2,000 psi, 4,000 psi, 6,000 psi, 8,000 psi, 10,000 psi, and 12,000 psi. These results demonstrated that the results of sintering in a conventional gas-fired rotary kiln in terms of long term conductivity and long term permeability can be approached by sintering in a microwave furnace.

Exemplary embodiments of the present disclosure further relate to any one or more of the following paragraphs:

1. A method for forming sintered substantially round and spherical pellets, comprising: forming substantially round and spherical green pellets from raw materials comprising water and kaolin clay; and sintering the green pellets in a microwave furnace at a temperature of from about 1480° C. to about 1520° C. for a time at peak temperature of from about 20 to about 45 minutes, to form a proppant having a bulk density of from about 1.35 to about 1.60 g/cm$^3$ and a crush percent at 7500 psi of from about 1.5 to about 3.5; wherein the proppant has a bulk density and a crush percent at 7500 psi that is less than that of proppant made from the green pellets and sintered in a gas-fired rotary kiln.

2. The method according to paragraph 1, wherein the proppant has an apparent specific gravity of about 2.6 to about 2.8.

3. The method according to paragraphs 1 or 2, wherein the proppant has a long term conductivity of about 1475 mD-ft to about 8825 mD-ft and a long term permeability of from about 90 D to about 480 D.

4. The method according to any one of paragraphs 1 to 3, wherein the green pellets have a size of from 16 to 80 U.S. mesh.

5. The method according to any one of paragraphs 1 to 4, wherein the green pellets are sintered in the microwave furnace for about 50 to about 200 minutes.

6. The method according to any one of paragraphs 1 to 5, wherein the substantially round and spherical green pellets are prepared from a slurry having a solids content of from about 40 to about 60% by weight and having an alumina content in a range of from about 40 to about 55% by weight.

7. A method for producing sintered particles comprising: preparing a slurry having a solids content of from about 40 to about 60% by weight, and comprising water and a raw material having an alumina content in a range of from about 40 to about 55% by weight; atomizing the slurry into droplets; coating seeds comprising alumina with the droplets to form green particles; and sintering the green particles in a microwave furnace at a temperature of from about 1480° C. to about 1520° C. for a time at peak temperature of from about 20 to about 45 minutes, to form a proppant having a bulk density of from about 1.35 to about 1.60 g/cm$^3$ and a crush percent at 7500 psi of from about 1.5 to about 3.5; wherein the proppant has a bulk density and a crush percent at 7500 psi that is less than that of proppant made from the green particles and sintered in a gas-fired rotary kiln.

8. The method according to paragraph 7, wherein the green particles are sintered for about 50 to about 200 minutes.

9. The method according to paragraphs 7 or 8, further comprising adding to the slurry at least one of a pH-adjusting reagent, a dispersant and a defoamer before atomizing the slurry.

10. The method according to any one of paragraphs 7 to 9, wherein atomizing the slurry comprises feeding the slurry to a fluidizer operable to atomize the slurry into droplets; and wherein the seeds are positioned in a particle bed in the fluidizer.

11. The method according to any one of paragraphs 7 to 10, further comprising drying the green particles before sintering.

12. A system for producing sintered particles comprising: a source of raw material having an alumina content in a range of from about 40 to about 55% by weight; a blunger operable to receive a feed of the raw material, and to prepare a slurry from the raw material by mixing the raw material and water; a heat exchanger operable to heat the slurry to a temperature of from about 25° C. to about 90° C.; a fluidizer comprising at least one nozzle and a particle bed, wherein the fluidizer is operable to receive a pressurized feed of the slurry and pump the slurry under pressure through the at least one nozzle as a spray, and wherein the particle bed is populated with seeds, which seeds are coated with the slurry spray to form particles; and a microwave furnace operable to receive and sinter at least a portion of the particles formed by the fluidizer, which sintering is performed at a temperature of from about 1480° C. to about 1520° C. for a time at peak temperature of from about 20 to about 45 minutes, to form sintered particles having a bulk density of from about 1.35 to about 1.60 g/cm$^3$ and a crush percent at 7500 psi of from about 1.5 to about 3.5.

13. The system according to paragraph 12, further comprising at least one of: a tank operable to receive a feed of the slurry from the blunger, and to mix a binder with the slurry; a grinding mill operable to grind particles in the slurry to a target size before the slurry is fed to the fluidizer; a pump system operable to receive a feed of the slurry from the heat exchanger and to provide a pressurized feed of the slurry to the fluidizer; and a drier operable to dry the particles before the particles are sintered.

14. The system according to paragraphs 12 or 13, further comprising at least one of a first screening unit operable to screen the slurry to a target size before the slurry is fed to the fluidizer; a second screening unit operable to receive the particles from the fluidizer and screen the particles for size prior to sintering; and a third screening unit operable to receive the sintered particles from the sintering device and screen the sintered particles for size.

15. A substantially round and spherical sintered particle comprising: a seed comprising alumina; and a coating comprising alumina, wherein the coating comprises at least about 80% of the total volume of the substantially round and spherical sintered particle; wherein the sintered particle has: a bulk density in a range of from about 1.35 g/cm$^3$ to about 1.60 g/cm$^3$; a crush strength at 7500 psi of from about 1.5 percent to about 3.5 percent; a short term conductivity of from about 1475 mD-ft to about 8825 mD-ft.; and a long term permeability of from about 90 D to about 480 D.

16. A method of fracturing a subterranean formation comprising: injecting a hydraulic fluid into the subterranean formation at a rate and pressure sufficient to open a fracture therein; and injecting a fluid containing substantially round and spherical sintered particles into the fracture, wherein the substantially round and spherical sintered particles: have an alumina content of about 40% by weight to about 55% by weight, and a bulk density of about 1.35 g/cm$^3$ to about 1.60 g/cm$^3$; and were formed by: preparing a slurry having a solids content of about 40% to about 60% by weight, and comprising water and a raw material having an alumina content in a range of from about 40% by weight to about 55% by weight; atomizing the slurry into droplets; coating seeds comprising alumina with the droplets to form green particles; and sintering in a microwave furnace at least a portion of the green particles at a temperature of from about 1480° C. to about 1520° C. for a time at peak temperature of from about 20 to about 45 minutes.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account numerical error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The substantially round and spherical solid ceramic particles that are produced according to the methods described herein are suitable for a variety of uses, including but not limited to use as a proppant in oil or gas wells, and as a foundry media. Other embodiments of the current invention will be apparent to those skilled in the art from a consideration of this specification or practice of the invention disclosed herein. However, the foregoing specification is considered merely exemplary of embodiments of the invention with the true scope and spirit of the invention being indicated by the following claims.

What is claimed is:

1. A method for forming sintered substantially round and spherical pellets, comprising:
   forming substantially round and spherical green pellets from raw materials comprising water and kaolin clay; and
   sintering the green pellets in a microwave furnace at a temperature of from about 1480° C. to about 1520° C. for a time at peak temperature of from about 20 to about 45 minutes, to form a proppant having a bulk density of from about 1.35 to about 1.60 g/cm$^3$ and a crush percent at 7500 psi of from about 1.5 to about 3.5;
   wherein the proppant has a bulk density and a crush percent at 7500 psi that is less than that of proppant made from the green pellets and sintered in a gas-fired rotary kiln.

2. The method of claim 1, wherein the proppant has an apparent specific gravity of about 2.6 to about 2.8.

3. The method of claim 1, wherein the green pellets have a moisture content of at least about 25% by weight.

4. The method of claim 1, wherein the green pellets have a size of from 16 to 80 U.S. mesh.

5. The method of claim 1, wherein the green pellets are sintered in the microwave furnace for about 50 to about 200 minutes.

6. The method of claim 1, wherein the substantially round and spherical green pellets are prepared from a slurry having a solids content of from about 40 to about 60% by weight and having an alumina content in a range of from about 40 to about 55% by weight.

7. A method for producing sintered particles comprising:
   preparing a slurry having a solids content of from about 40 to about 60% by weight, and comprising water and a raw material having an alumina content in a range of from about 40 to about 55% by weight;
   atomizing the slurry into droplets;
   coating seeds comprising alumina with the droplets to form green particles; and
   sintering the green particles in a microwave furnace at a temperature of from about 1480° C. to about 1520° C. for a time at peak temperature of from about 20 to about 45 minutes, to form a proppant having a bulk density of from about 1.35 to about 1.60 g/cm$^3$ and a crush percent at 7500 psi of from about 1.5 to about 3.5;
   wherein the proppant has a bulk density and a crush percent at 7500 psi that is less than that of proppant made from the green particles and sintered in a gas-fired rotary kiln.

8. The method of claim 7, wherein the green particles are sintered for about 50 to about 200 minutes.

9. The method of claim 7, further comprising adding to the slurry at least one of a pH adjusting reagent, a dispersant and a defoamer before atomizing the slurry.

10. The method of claim 7, wherein atomizing the slurry comprises feeding the slurry to a fluidizer operable to atomize the slurry into droplets; and wherein the seeds are positioned in a particle bed in the fluidizer.

11. The method of claim 7, further comprising drying the green particles before sintering.

* * * * *